US007143938B2

(12) United States Patent
Hammerle

(10) Patent No.: US 7,143,938 B2
(45) Date of Patent: Dec. 5, 2006

(54) CHECKOUT AREA GATE AND METHOD OF USING SAME

(75) Inventor: Jurgen Hammerle, Gunzburg (DE)

(73) Assignee: Wanzl Metallwarenfabrik GmbH, Leipheim (DE)

( * ) Notice: Subject to any disclaimer, the term of this patent is extended or adjusted under 35 U.S.C. 154(b) by 47 days.

(21) Appl. No.: 10/906,439

(22) Filed: Feb. 19, 2005

(65) Prior Publication Data

US 2005/0128049 A1 Jun. 16, 2005

Related U.S. Application Data

(63) Continuation-in-part of application No. PCT/DE2003/003575, filed on Oct. 28, 2003.

(30) Foreign Application Priority Data

Nov. 16, 2002 (DE) .......................... 202 17 728 U

(51) Int. Cl.
*G06K 15/00* (2006.01)

(52) U.S. Cl. ...................................... 235/383; 235/382

(58) Field of Classification Search ................ 235/383, 235/462.14, 462.45, 385, 375, 381, 382, 235/382.5; 186/52, 59; 340/572.1
See application file for complete search history.

(56) References Cited

U.S. PATENT DOCUMENTS 4,583,083 A * 4/1986 Bogasky .................. 340/572.1
4,783,967 A * 11/1988 Mullen ......................... 62/3.3
5,392,025 A 2/1995 Figh et al.
5,747,784 A * 5/1998 Walter et al. ............... 235/383
5,992,570 A * 11/1999 Walter et al. ................. 186/36
6,550,672 B1 * 4/2003 Tracy et al. ................ 235/383

FOREIGN PATENT DOCUMENTS

DE 33 27 378 2/1985
DE 38 37 276 5/1990

OTHER PUBLICATIONS

International Search Report dated Mar. 26, 2004.

* cited by examiner

*Primary Examiner*—Thien M. Le
(74) *Attorney, Agent, or Firm*—Buchanan Ingersoll & Rooney PC

(57) ABSTRACT

A device for use in a checkout area of a self-service store has at least one part operable by electromotive and/or electromechanical operation, the operating arrangement of which is controlled by an electronic control unit, optionally with a manually actuatable operating device which controls the operating arrangement if necessary. The control unit has an interface for receiving and forwarding data existing in electronic form. The data originates both from an electronic checkout located in the checkout area of the self-service store and also from the device itself. The data originating from the checkout via the interface are intended for forwarding to the device and the data originating from the device via the interface are intended for forwarding to the checkout.

9 Claims, 1 Drawing Sheet

CHECKOUT AREA GATE AND METHOD OF USING SAME

CROSS-REFERENCE TO RELATED APPLICATION

The present application is a continuation-in-part of PCT/DE 2003/003575, filed on Oct. 28, 2003, which claims the priority of DE 202 17 728.9, filed on Nov. 16, 2002. The contents of PCT/DE2003/003575 and DE 202 17 728.9 are incorporated herein by reference.

FIELD OF THE INVENTION

The invention relates to a device for use in the checkout area of a self-service store.

DISCUSSION OF RELATED ART

Devices in the form of merchandise holders in the checkout area of self-service stores are known. Their aim is to encourage the customers queuing at the checkout into making a spontaneous purchase. Devices also located in checkout areas are lockable swing gates that block checkout aisles when the checkouts associated with those aisles are not occupied. New merchandise holders are equipped with at least one closing grille operable by electromotive means. The swing gates have an electromechanical locking device. All these devices are thus equipped with a mobile part which may be controlled with the aid of an electronic control device. In addition, these devices may be equipped with a manually actuatable operating device which may be used, for example, if the control device fails, perhaps, or if aspects of the safety regulations absolutely require a device of this kind to be present.

When leaving the checkout operator's position, the cashier is obliged to close off the checkout, shut the closing grille of the corresponding merchandise holder and lock the swing gate in a position closing the checkout aisle. Carrying out these activities is time-consuming.

OBJECT AND SUMMARY

An object of the present invention is to reduce the aforementioned activities and thereby cut down the amount of time they require.

An advantage of the suggested solution lies in the fact that the control unit of each device is additionally equipped with its own interface, with which a communicative connection to the corresponding electronic checkout located in the checkout area may be established. This connection may be used, for example, such that, in the process of activating a checkout, data in electronic form is passed on from this checkout via the interface to the electronic control unit of the device, so that the control unit controls the operating arrangement of the mobile part of the device so that this part is induced to effect a movement. Applied to a merchandise holder, this means that the closing grille of the merchandise holder is automatically opened when the electronic checkout is activated. In the case of the swing gate, this in turn brings about the automatic unlocking of the locking device and opening up of the checkout aisle. Conversely, the aforementioned communicative connection allows the switching-off of the electronic checkout to bring about the automatic shutting of the closing grille of the merchandise holder and/or independent closing of the checkout aisle by the swing gate as well as subsequent automatic locking of the swing gate. To enable these operations to be carried out, the control unit of the at least one device and, if necessary, also the electronic checkout are therefore accordingly programmable. The suggested solution considerably reduces the activities described in the introduction as well as the amount of time generated by the said activities.

DETAILED DESCRIPTION

Figure 1:
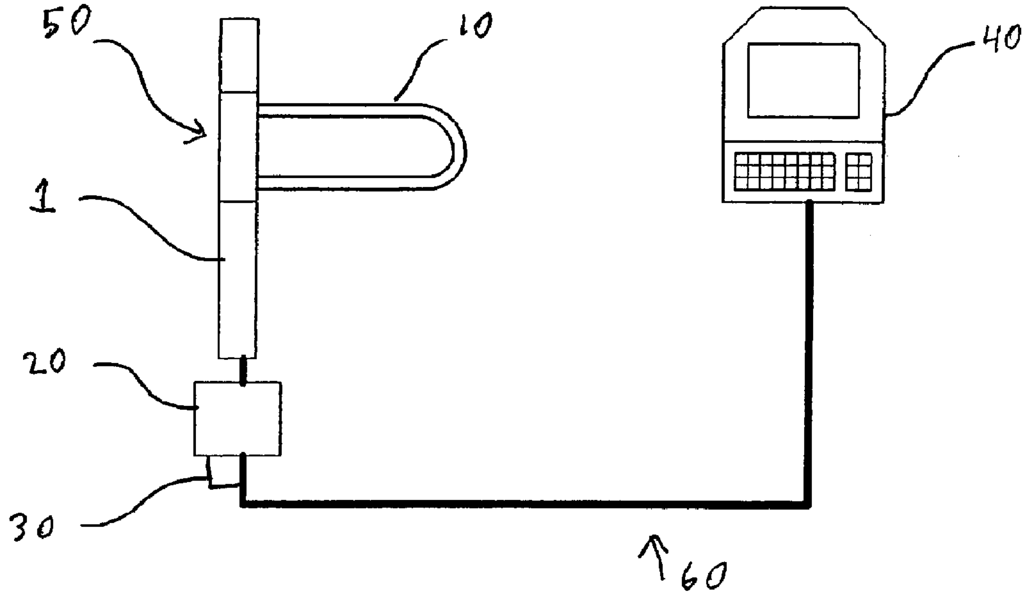
FIG. 1 shows an embodiment of the present invention.
Figure 2:
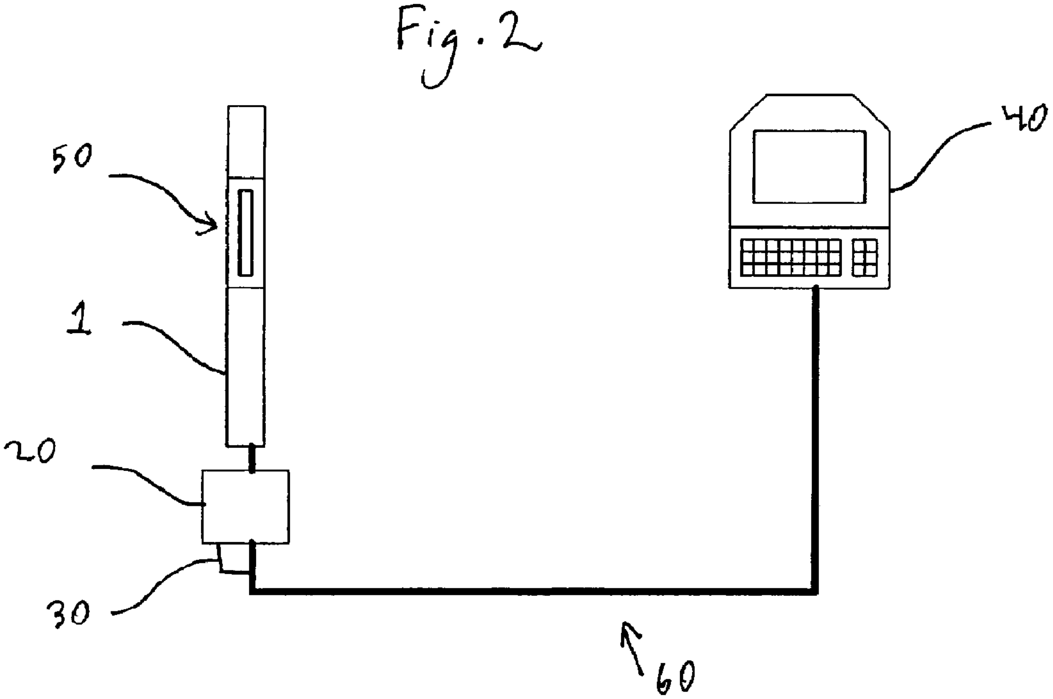
FIG. 2 shows the embodiment shown in FIG. 1 in a different position.

FIGS. 1 and 2 illustrate a merchandise holder according to an embodiment of the present invention.

FIG. 1 shows a first position and FIG. 2 shows a second position. A merchandise holder, for example a cigarette dispenser, equipped with an operating arrangement corresponding to PCT Publication No. WO 03/028184, the subject matter of which is hereby incorporated herein by reference, is suitable as a first device for the use in implementation of an embodiment of the present invention. This operating arrangement is intended for raising and lowering or opening and closing the at least one closing grille 10 of the merchandise holder. An electronic control unit 20 thereof is equipped with an interface 30 which is suitable for picking up data existing in electronic form and originating from an electronic checkout 40, and for processing the data and forwarding it to the control unit 20. The data relates, for example, to operating conditions of the electronic checkout 40, for instance indicating that the checkout is active, or show the checkout is inactive. Data may also be sent from the control unit 20 the electronic checkout 40 indicating the status of the closing grille 10.

A lockable swing gate 50, which has at least one controllable electromechanical operating arrangement in the form of a locking device (not shown) and also, advantageously, an electromotive, similarly controllable operating arrangement for moving the gate 50, is suitable as another device with which the solution according to the invention may also be implemented. Such swing gates 50 belong to the prior art. They also have an electronic control unit and this is now similarly equipped according to the invention with the interface 30 which is able to pick up data existing in electronic form from an electronic checkout 40, process them and forward them to the control unit 20.

The two devices just described may optionally be equipped for safety regulation reasons with a manually actuatable operating device, such as a switch, with which commands such as on/off may be given to the corresponding operating arrangement or locking device.

The known transmission options, such as cable, radio, infrared and the like, are suitable for transmitting electronic data originating from an electronic checkout and intended for the devices, these signals for the interface, in the case of transmission by radio or infrared, first having to be converted into a suitable electronic form. The transmission of the electronic data may also take place from the device to the checkout with the assistance of the interface. a path of transmission 60 is shown in FIGS. 1 and 2.

A merchandise holder, or a swing gate, or both, are preferably possible as the device. A fixture or the like equipped with an operable part and where the fixture is intended to be installed in the checkout area of a self-service store and is provided for the use of or usage by customers visiting the store is also conceivable as the at least one device.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A device for use in the checkout area of a self-service store, the device comprising:

at least one part operable by an electromotive or electromechanical operation, an electronic control unit for controlling operation of the at least one part, the control unit has an interface for receiving and forwarding data existing in electronic form, wherein the data originates both from an electronic checkout located in the checkout area of the self-service store and also from the device itself, and the control unit includes a circuit for forwarding data originating from the checkout via the interface to the device indicating an operating status of the checkout and a circuit for forwarding data originating from the device indicating a status of the at least one operable part via the interface to the checkout.

2. The device according to claim 1, wherein the electronic control unit controls an operating arrangement of the operable part such that this part is induced to effect a movement.

3. A device for use in the checkout area of a self-service store, the device comprising:

at least one part operable by an electromotive or electromechanical operation, an electronic control unit for controlling operation of the at least one part, the control unit has an interface for receiving and forwarding data existing in electronic form, wherein the data originates both from an electronic checkout located in the checkout area of the self-service store and also from the device itself, and the control unit includes a circuit for forwarding data originating from the checkout via the interface to the device and a circuit for forwarding data originating from the device via the interface to the checkout, wherein the electronic control unit controls an operating arrangement of the operable part such that this part is induced to effect a movement, and wherein the operable part is a closing grille of a merchandise holder.

4. The device according to claim 2, wherein the operable part is a gate leaf of a swing gate intended for opening and closing a checkout aisle.

5. The device according to claim 1, wherein the operable part is designed as a locking device and is a component part of a swing gate, wherein the locking device may be used to open up or close a checkout aisle.

6. The device according to claim 1, wherein either cable or radio or infrared are provided as transmission means for transmitting the data originating from the electronic checkout.

7. The device according to claim 2, wherein the operating arrangement is designed as a locking device and is a component part of a swing gate, wherein the locking device may be used to open up or close a checkout aisle.

8. The device according to claim 2, further comprising a manually actuatable operating device which can control the operating arrangement.

9. A method for operating at least one part in the checkout area of a self-service store, wherein operation of the at least one part is controllable by an electronic control unit, the method comprising:

sending data in electronic form to the control unit from a checkout area of the self-service store, operating the at least one part based on the data sent to the control unit, and sending data concerning the status of the at least one part in electronic form the control unit to the checkout area.

* * * * *